United States Patent
Majjigi et al.

(10) Patent No.: US 9,621,310 B2
(45) Date of Patent: Apr. 11, 2017

(54) TTI BUNDLING FOR DOWNLINK COMMUNICATION

(71) Applicant: Apple Inc., Cupertino, CA (US)

(72) Inventors: Vinay Majjigi, Sunnyvale, CA (US); Tarik Tabet, Los Gatos, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 106 days.

(21) Appl. No.: 14/496,385

(22) Filed: Sep. 25, 2014

(65) Prior Publication Data

US 2015/0180619 A1 Jun. 25, 2015

Related U.S. Application Data

(60) Provisional application No. 61/920,263, filed on Dec. 23, 2013, provisional application No. 61/927,566, filed on Jan. 15, 2014.

(51) Int. Cl.
*H04L 5/00* (2006.01)
*H04L 1/18* (2006.01)

(52) U.S. Cl.
CPC .......... *H04L 5/0005* (2013.01); *H04L 1/1896* (2013.01); *H04L 5/0055* (2013.01); *H04L 1/1819* (2013.01); *H04L 1/1893* (2013.01)

(58) Field of Classification Search
CPC ... H04L 5/0005; H04L 1/1861; H04L 5/0055; H04L 1/1896; H04L 1/1819; H04L 1/1893; H04W 72/042; H04W 72/0413
See application file for complete search history.

(56) References Cited

U.S. PATENT DOCUMENTS

| 8,687,602 B2 | 4/2014 | Choi | |
|---|---|---|---|
| 2011/0075611 A1* | 3/2011 | Choi | H04L 1/1819 370/329 |
| 2013/0258960 A1* | 10/2013 | Chen | H04W 72/0406 370/329 |

(Continued)

FOREIGN PATENT DOCUMENTS

| EP | 2635082 | 4/2013 |
|---|---|---|
| JP | 2013509035 A | 3/2013 |
| WO | 2014025381 | 2/2014 |

OTHER PUBLICATIONS

Office Action, Japanese Application No. 2014-232925, mailed Nov. 27, 2015, 6 pages.

(Continued)

*Primary Examiner* — Christopher Grey
(74) *Attorney, Agent, or Firm* — Meyertons Hood Kivlin Kowert & Goetzel, P.C.; Jeffrey C. Hood

(57) ABSTRACT

This disclosure relates to TTI bundling for downlink communication. According to one embodiment, a base station and a wireless device may establish a wireless communication link. The base station may determine to enable TTI bundling for downlink communication for at least one carrier of the wireless communication link. The base station may provide an indication to the wireless device to enable TTI bundling for downlink communication for the determined carrier(s) of the wireless communication link. The base station may subsequently transmit TTI bundle downlink communications to the wireless device via the determined carrier(s).

21 Claims, 5 Drawing Sheets

(56) References Cited

U.S. PATENT DOCUMENTS

| | | | |
|---|---|---|---|
| 2014/0056237 A1* | 2/2014 | Eriksson | H04L 1/0006 370/329 |
| 2014/0056243 A1* | 2/2014 | Pelletier | H04W 74/04 370/329 |
| 2014/0112289 A1* | 4/2014 | Kim | H04W 16/14 370/329 |
| 2014/0185534 A1 | 7/2014 | Vos et al. | |
| 2014/0341194 A1* | 11/2014 | Sandberg | H04L 1/0025 370/336 |
| 2015/0036476 A1* | 2/2015 | Vos | H04W 72/1278 370/216 |
| 2015/0039958 A1* | 2/2015 | Vos | H04L 1/1819 714/748 |

OTHER PUBLICATIONS

Ericsson, Introducing LTE in Unlicensed Spectrum[online], 3GPP TSG-RAN #62 RP-131635, Internet, Nov. 26, 2013, 9 pages. [http://www.3gpp.org/ftp/tsg_ran/TSG_RAN/TSGR_62/Docs/RP-131635.zip].

* cited by examiner

TTI BUNDLING FOR DOWNLINK COMMUNICATION

PRIORITY CLAIM

The present application claims benefit of priority to U.S. Provisional Application No. 61/920,263 titled "TTI Bundling for Downlink Communication" and filed on Dec. 23, 2013, and to U.S. Provisional Application No. 61/927,566 titled "TTI Bundling for Downlink Communication" and filed on Jan. 15, 2014, both of which are hereby incorporated by reference in their entirety as though fully and completely set forth herein.

FIELD

The present application relates to wireless devices, and more particularly to a system and method for performing transmission time interval (TTI) bundling in the downlink of a wireless communication system.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

In some wireless communication systems, such as certain cellular communication networks, wireless communication is performed on frequency bands which have been licensed (e.g., by a cellular network provider). Additionally, in some wireless communication systems, such as Wi-Fi and Bluetooth wireless communication systems, wireless communication is performed on unlicensed frequency bands, such as the 2.4 GHz ISM frequency band.

SUMMARY

Embodiments are presented herein of, inter alia, methods for performing transmission time interval (TTI) bundling in the downlink of a wireless communication system, and of devices configured to implement the methods.

According to the techniques described herein, a base station and a wireless device may establish a wireless communication link according to a wireless communication technology. At least in some instances, the wireless communication link may include carrier aggregation, such that at least a primary component carrier and a secondary component carrier are established between the base station and the wireless device.

The base station may determine to enable TTI bundling for downlink communications between the base station and the wireless device. TTI bundling may be enabled for any of a variety of reasons, in order to provide more robust downlink communication characteristics. For example, if downlink transmit power on a component carrier is limited (e.g., due to regulations on a frequency band on which the component carrier is deployed), TTI bundling may be enabled in order to compensate for the limited transmit power available. As another possibility, if a communication channel is experiencing degraded channel conditions, and/or experiences substantial signal attenuation as a qualitative characteristic of the communication channel, TTI bundling may be enabled to compensate for such considerations. Other reasons (including combinations of the above reasons and/or additional reasons) may also provide the basis for a base station to determine to enable TTI bundling.

After determining to do so, the base station may provide an indication to the wireless device to enable TTI bundling. The base station and the wireless device may then subsequently engage in downlink communication using TTI bundling.

If desired, such downlink TTI bundling may be enabled on a per-carrier basis. This may allow the base station and the wireless device to perform downlink communication with TTI bundling on component carriers for which conditions warrant it (for example, on a secondary component carrier in an unlicensed frequency band, which may be subject to transmit power limits, interference due to other wireless communication technologies, etc.) while performing downlink communication without TTI bundling on component carriers for which conditions are sufficiently good as to render it unnecessary (for example, on a primary component carrier in a licensed frequency band).

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
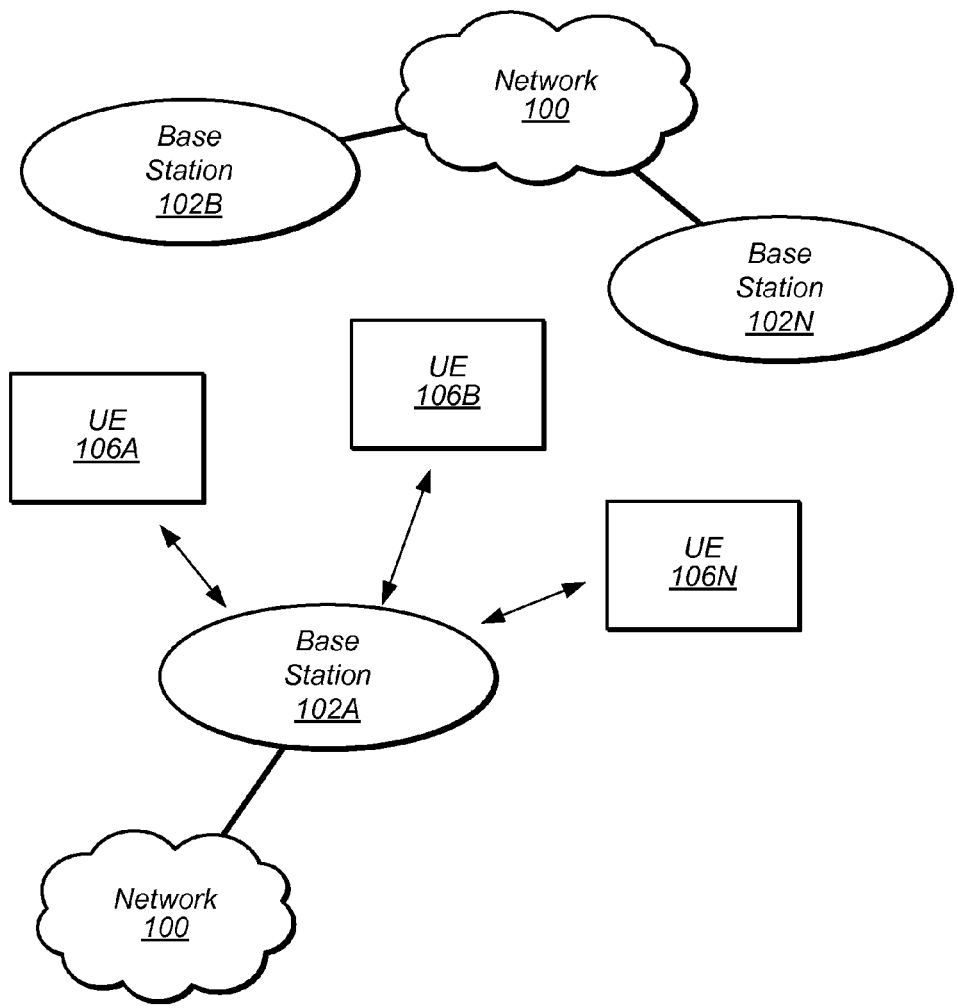
FIG. 1 illustrates an exemplary (and simplified) wireless communication system, according to one embodiment.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
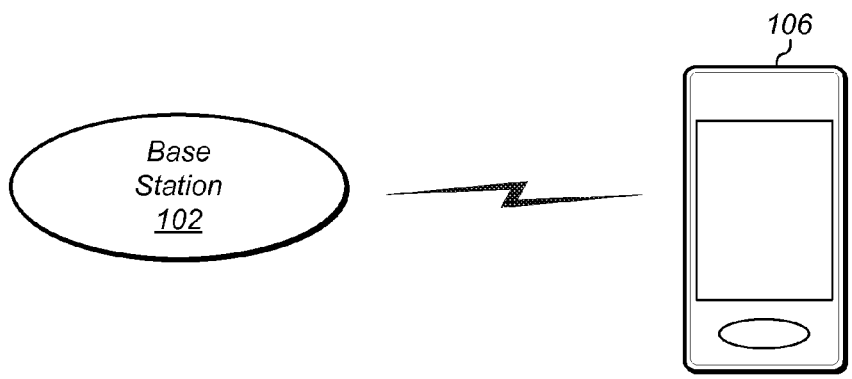
FIG. 2 illustrates a base station (BS), or "eNB" in LTE, in communication with a user equipment (UE) device, according to one embodiment.

FIGS. 1 and 2—Communication System

FIG. 1 illustrates an exemplary (and simplified) wireless communication system, according to one embodiment. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to one embodiment. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
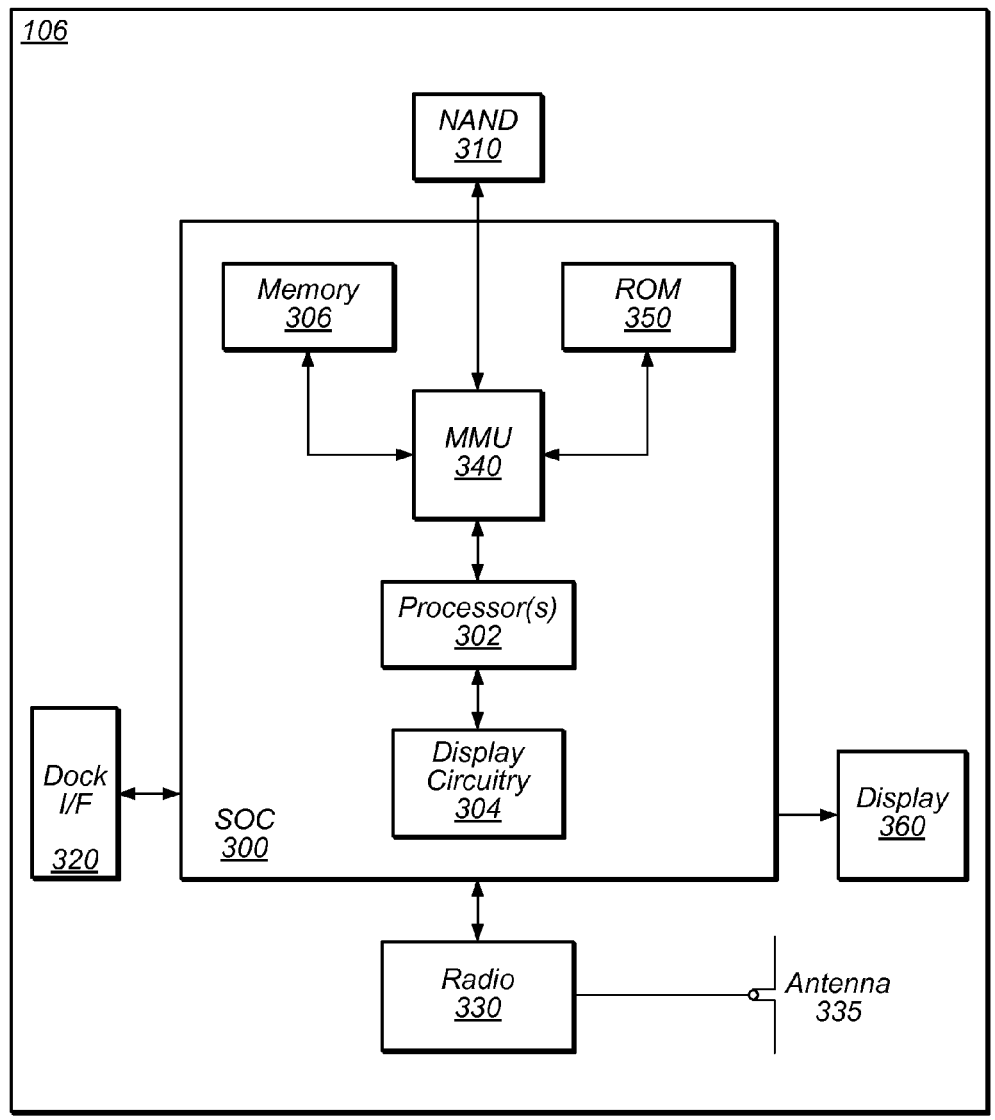
FIG. 3 illustrates an exemplary block diagram of a UE, according to one embodiment.

FIG. 3—Exemplary Block Diagram of a UE

FIG. 3 illustrates an exemplary block diagram of a UE 106, according to one embodiment. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna, (and possibly multiple antennas, e.g., for MIMO and/or for implementing different wireless communication technologies, among various possibilities) performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features for TTI bundling for downlink communication, such as those described herein with reference to, inter alia, FIG. 6. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 6.

Figure 4:
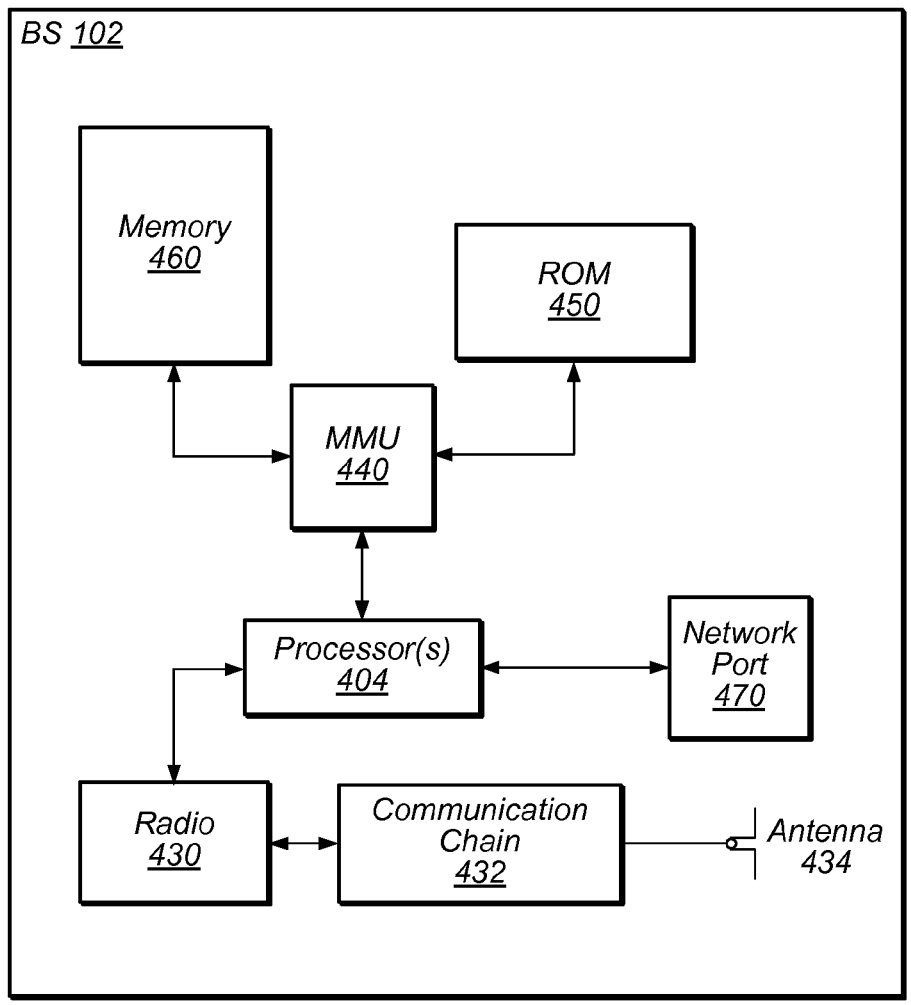
FIG. 4 illustrates an exemplary block diagram of a BS, according to one embodiment.

FIG. 4—Exemplary Block Diagram of a Base Station

FIG. 4 illustrates an exemplary block diagram of a base station 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

As described further subsequently herein, the BS 102 may include hardware and software components for implementing features for TTI bundling for downlink communication, such as those described herein with reference to, inter alia, FIG. 6. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein, such as the features described herein with reference to, inter alia, FIG. 6.

Figure 5:
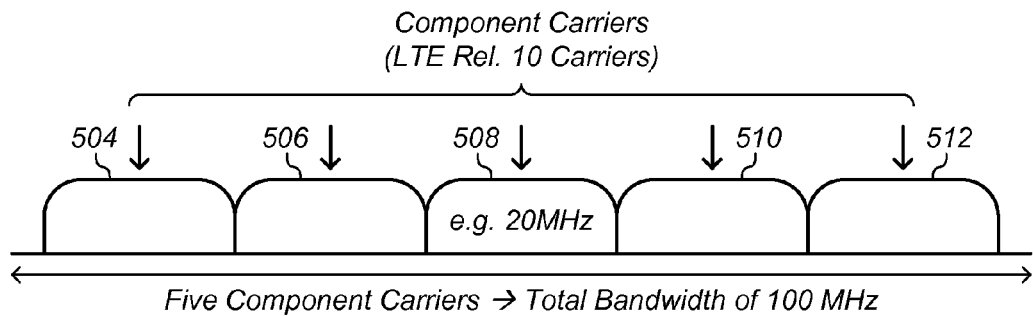
FIG. 5 illustrates an exemplary carrier aggregation scheme, according to one embodiment.

FIG. 5—Carrier Aggregation

Carrier aggregation is a scheme in which multiple carriers (e.g., frequency channels) may be used for wireless communication with a UE according to a wireless communication technology. FIG. 5 illustrates one exemplary carrier aggregation scheme (e.g., which may be used in accordance with the LTE radio access technology) which may be used in accordance with other aspects of this disclosure, such as with respect to the method of FIG. 6.

In the illustrated scheme, up to five component carriers (carriers 504, 506, 508, 510, 512) may be aggregated for a single user device (such as one of the UEs 106 illustrated in and described with respect to FIGS. 1-3). Each component carrier may use a channel width of up to 20 MHz. As one possibility, each component carrier may be an LTE release 10 single carrier. Thus, according to the exemplary scheme, a UE may be allocated up to 100 MHz of bandwidth. In many instances, such a carrier aggregation scheme may enable a UE participating in it with greater throughput than without such a scheme.

In many cases, component carriers may utilize adjacent frequency channels. However, it should be noted that it is also possible to implement carrier aggregation utilizing non-continuous frequency channels, potentially including non-continuous frequency channels within the same frequency band, and/or frequency channels within different frequency bands. For example, it may be possible to implement carrier aggregation using a frequency channel in a licensed frequency band as one component carrier, and a frequency channel in an unlicensed frequency band as another component carrier.

It should be noted that while the exemplary scheme illustrated in FIG. 5 and the associated description are provided by way of example as one possible manner of implementing carrier aggregation, they are not intended to be limiting to the disclosure as a whole. Numerous alternatives to and variations of the details thereof are possible and should be considered within the scope of the present disclosure. For example: carrier aggregation schemes may be implemented in conjunction with other wireless communication technologies; carriers according to other LTE releases or other radio access technologies altogether may be used; carriers having different channel widths may be used; different numbers of component carriers may be supported; and/or any of numerous other alternatives to and variations of the illustrated scheme are also possible.

Note that for systems which implement carrier aggregation, various control schemes/mechanisms are possible. As one possibility, an independent cell may be implemented on each component carrier, for example by providing a control channel with data scheduling and other control features for each cell on the component carrier for that cell. As another possibility, some or all control functions may be centralized. For example, a "primary cell" might be implemented on one ("primary") component carrier, while "secondary cells" might be implemented on any additional ("secondary") component carriers, such that some or all control information for the secondary cells is communicated by way of the primary cell.

Such a scheme may be referred to as "cross-carrier scheduling". In such a scheme, a network may provide control data (e.g., for scheduling user data communications, performing mobility related functions, etc.) for all cells by way of a control channel of the primary cell. For example, the control data may be communicated by way of a physical downlink control channel (PDCCH) of the primary cell.

The network may provide user data (e.g., application data for networking applications such as web browser applications, email applications voice call applications, video chat applications, game applications, etc.) to a UE in such a scheme on any or all of the primary or secondary cells. For example, various portions of the user data may be communicated by way of a physical downlink shared channel (PDSCH) of each of the primary cell and the secondary cells.

Thus, cross-carrier scheduling may be used in conjunction with carrier aggregation to centralize (at least a portion of) control communications on one cell. This technique may be used in many instances for infrastructure mode communications between a UE and a network. Such a technique may be particularly useful if different component carriers are known and/or expected to have different interference levels, since in such a case the carrier having the lowest interference level may advantageously be used for high priority control data. Such a situation may be the case, for example, if one component carrier is on a licensed frequency band for which the potential for interference is substantially limited to that caused by network controlled wireless communication, while another component carrier is on an unlicensed frequency band which may be subject to interference caused by wireless communication which is not under network control.

Figure 6:
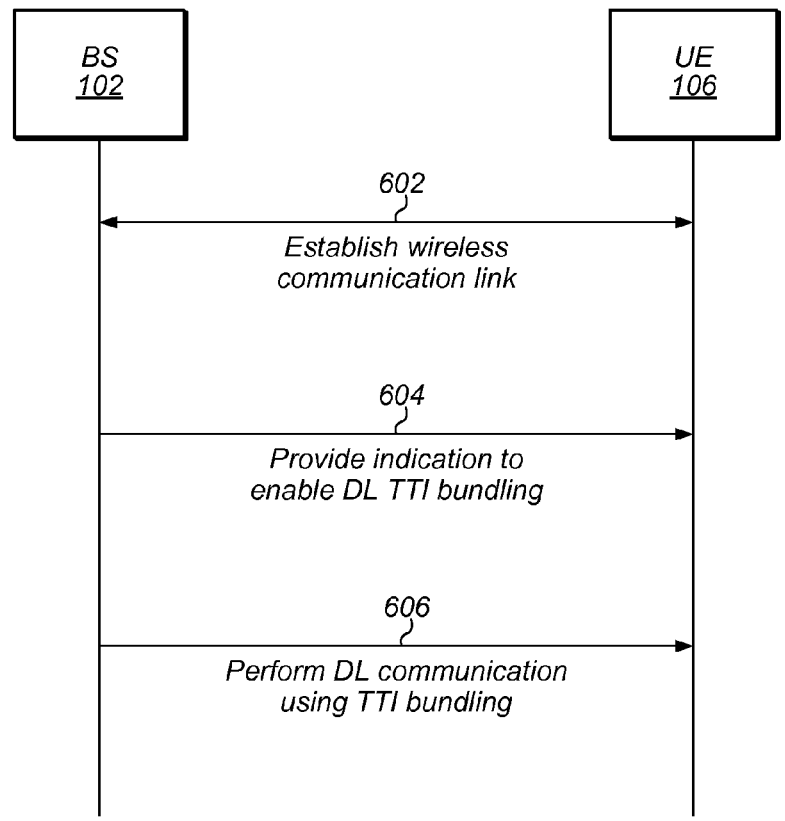
FIG. 6 is a communication flow diagram illustrating an exemplary method for performing TTI bundling in the downlink of a wireless communication system, according to one embodiment.

FIG. 6—Communication Flow Diagram

FIG. 6 is a communication/signal flow diagram illustrating a scheme for transmission time interval (TTI) bundling for downlink communication. The scheme shown in FIG. 6 may be used in conjunction with any of the computer systems or devices shown in the above Figures, among other devices. As shown, according to the scheme a BS 102 (e.g., such as illustrated in and described with respect to FIGS. 1-2 and 4) may provide a UE 106 (e.g., such as illustrated in and described with respect to FIGS. 1-3) with a wireless communication link in which TTI bundling may be enabled and used for DL communication if desired.

TTI bundling may be a modification of a Hybrid Automatic Repeat Request (HARM) feature which may be implemented at the media access control (MAC) layer of a device according to some wireless communication technologies. Typically the use of HARQ may include waiting for an ACK/NACK after a first transmission attempt, and if it is determined that the first transmission attempt was unsuccessful, performing a HARQ retransmission. This may be repeated up to a certain (e.g., network configured maximum) number of retransmissions. In the case of TTI bundling, instead of waiting for an ACK/NACK before performing a HARQ retransmission, multiple HARQ transmissions of a single packet may be performed in successive TTIs. This feature may provide very robust packetized transmissions with low latency, which may be useful for traffic types with strict latency and/or reliability requirements (such as voice communications) in difficult RF conditions.

In various embodiments, some of the elements of the scheme shown may be performed concurrently, in a different order than shown, or may be omitted. Additional elements may also be performed as desired. As shown, the scheme may operate as follows.

In 602, a wireless communication link may be established between the UE 106 and the BS 102. The wireless communication link may be established according to a first wireless communication technology (or "radio access technology" or "RAT"), such as LTE.

Establishing the wireless communication link may include establishing (e.g., configuring) a primary component carrier (or "primary carrier" or "primary cell") between the BS 102 and the UE 106. The primary carrier may be established on a particular ("first") channel (e.g., a frequency channel).

In some cases, establishing the wireless communication link may also include establishing (e.g., configuring) a secondary component carrier (or "secondary carrier" or "secondary cell") between the BS 102 and the UE 106. The secondary carrier may be established on a different ("second") channel (e.g., a frequency channel) than the first channel. In other words, the wireless communication link may support/implement carrier aggregation, in some instances.

The first channel may be a channel in a licensed frequency band, which may also be referred to herein as a "first frequency band". For example, a cellular network provider may have licensed a particular frequency band (possibly specifically for use in conjunction with a particular radio access technology, such as LTE-A, LTE, WCDMA, CDMA2000, GSM, etc.), and may provide radio access to its cellular network via that licensed frequency band. Such a licensed frequency band may be subject to less external interference than an unlicensed frequency band. For example, an unlicensed frequency band might be subject to interference from other wireless communication technologies and/or from other cellular network operators utilizing a similar or the same wireless communication technology in the unlicensed frequency band, whereas a licensed frequency band may not be subject to such external interference sources, e.g., if the licensed frequency band is licensed for the exclusive use of one particular cellular network provider. The second channel may also be a channel in a licensed frequency band (e.g., the first frequency band or another licensed frequency band) or may be a channel in an unlicensed frequency band.

The wireless communication link may provide the UE 106 with a communication link to a cellular network, such as a core network of a cellular service provider (e.g., with which a user of the UE 106 may have a subscription and/or other agreement to provide cellular service). The cellular network may thus provide connectivity between the user device and various services and/or devices coupled to the cellular network, such as other user devices, a public switched telephone network, the Internet, various cloud-based services, etc.

In 604, the BS 102 may provide an indication to the UE 106 to enable TTI bundling for downlink communications between the BS 102 and the UE 106. The indication may be provided in any of a variety of ways. As one possibility, the indication may take the form of a (e.g., Boolean, bitmap, etc.) parameter (e.g., a "ttiBundling_DL" parameter) which may be included in an information element (IE) in a radio resource control (RRC) message. In such an instance, the IE may be a MAC-MainConfig IE, which is an IE that can be used to specify the MAC main configuration for signaling and data radio bearers.

Note that if the wireless communication link provides carrier aggregation, it may be the case that the indication to enable TTI bundling for downlink communications between the BS and the UE further specifies to enable TTI bundling for downlink communications between the BS and the UE on a specific carrier (e.g. the primary carrier or the secondary carrier). In other words, downlink TTI bundling may be enabled on a per-carrier basis, if desired. Alternatively, the indication to enable TTI bundling for downlink communications between the BS and the UE may apply to all component carriers, if desired.

As previously noted, unlicensed frequency bands may be subject to certain conditions which may negatively affect channel conditions, including but not limited to interference from other types of wireless communication such as Wi-Fi. It should be further noted that unlicensed frequency bands may also be subject to maximum transmission power limitations (e.g., imposed by regulatory bodies such as the United States Federal Communication Commission (FCC)). Furthermore, at least in some instances, downlink communications on unlicensed frequency bands may be performed on higher-frequency communication channels (e.g., 5.8 GHz, vs. 2 GHz in the uplink) which may be subject to significant signal attenuation.

Thus, as one possibility, the indication to enable TTI bundling may specify to enable TTI bundling for downlink communications between the BS 102 and the UE 106 on the secondary carrier, which may utilize a channel on an unlicensed frequency band.

Alternatively or additionally, in an instance where a ttiBundling_DL IE is used to configured downlink TTI bundling, a corresponding ttiBundling_UL IE may be used to configure uplink TTI bundling. The ttiBundling_UL IE may include information such as that indicated by the ttiBundling field as defined in 3GPP Technical Specification (TS) 36.331 version 11.5.0 (which is incorporated by reference for all purposes as if fully set forth herein), modified as necessary to reflect that the field relates specifically to configuring TTI bundling for the uplink.

Alternatively or additionally, in an instance where a ttiBundling_DL IE is included in a MAC-MainConfig IE, the MAC-MainConfig IE may include fields such as the following:

| MAC-MainConfig field descriptions |
| --- |
| dl-PathlossChangeDL |
| Pathless Change and the change of the required power backoff due to power management (as allowed by P-MPRc [42]) for PHR reporting in TS 36.321 [6]. Value in dB. Value dB1 corresponds to 1 dB, dB3 corresponds to 3 dB and so on. The same value applies for each serving cell (although the associated functionality is performed independently for each cell). |
| drx-Config |
| Used to configure DRX as specified in TS 36.321 [6]. E-UTRAN configures the values in DRX-Config-v1130 only if the UE indicates support for IDC indication. E-UTRAN configures drx-Config-v1130 only if drx-Config (without suffix) is configured. |
| drx-InactivityTimer |
| Timer for DRX in TS 36.321 [6]. Value in number of PDCCH sub-frames. Value psf1 corresponds to 1 PDCCH sub-frame, psf2 corresponds to 2 PDCCH sub-frames and so on. |
| drx-RetransmissionTimer |
| Timer for DRX in TS 36.321 [6]. Value in number of PDCCH sub-frames. Value psf1 corresponds to 1 PDCCH sub-frame, psf2 corresponds to 2 PDCCH sub-frames and so on. In case drx-RetransmissionTimer-v1130 is signalled, the UE shall ignore drx-RetransmissionTimer (i.e. without suffix). |
| drxShortCycleTimer |
| Timer for DRX in TS 36.321 [6]. Value in multiples of shortDRX-Cycle. A value of 1 corresponds to shortDRX-Cycle, a value of 2 corresponds to 2 * shortDRX-Cycle and so on. |
| extendedBSR-Sizes |
| If value setup is configured, the BSR index indicates extended BSR size levels as defined in TS 36.321 [6, Table 6.1.3.1-2]. |
| extendedPHR |
| Indicates if power headroom shall be reported using the Extended Power Headroom Report MAC control element defined in TS 36.321 [6] (value setup). Otherwise the power headroom shall be reported using the Power Headroom Report MAC control element defined in TS 36.321 [6]. E-UTRAN always configures the value setup if more than one Serving Cell with uplink is configured. E-UTRAN configures extendedPHR only if phr-Config is configured. The UE shall release extendedPHR if phr-Config is released. |
| longDRX-CycleStartOffset |
| longDRX-Cycle and drxStartOffset in TS 36.321 [6]. The value of longDRX-Cycle is in number of sub-frames. Value sf10 corresponds to 10 sub-frames, sf20 corresponds to 20 sub-frames and so on. If shortDRX-Cycle is configured, the value of longDRX-Cycle shall be a multiple of the shortDRX-Cycle value. The value of drxStartOffset value is in number of sub-frames. In case longDRX-CycleStartOffset-v1130 is signalled, the UE shall ignore longDRX-CycleStartOffset (i.e. without suffix). |

| MAC-MainConfig field descriptions |
| --- |
| maxHARQ-Tx |
| Maximum number of transmissions for UL HARQ in TS 36.321 [6].
onDurationTimer |
| Timer for DRX in TS 36.321 [6]. Value in number of PDCCH sub-frames.
Value psf1 corresponds to 1 PDCCH sub-frame, psf2 corresponds to 2
PDCCH sub-frames and so on.
periodicBSR-Timer |
| Timer for BSR reporting in TS 36.321 [6]. Value in number of sub-frames.
Value sf10 corresponds to 10 sub-frames, sf20 corresponds to 20 sub-
frames and so on.
periodicPHR-Timer |
| Timer for PHR reporting in TS 36.321 [6]. Value in number of sub-
frames.
Value sf10 corresponds to 10 sub frames, sf20 corresponds to 20
subframes and so on.
prohibitPHR-Timer |
| Timer for PHR reporting in TS 36.321 [6]. Value in number of sub-
frames.
Value sf0 corresponds to 0 subframes, sf100 corresponds to 100 subframes
and so on.
retxBSR-Timer |
| Timer for BSR reporting in TS 36.321 [6]. Value in number of sub-frames.
Value sf640 corresponds to 640 sub-frames, sf1280 corresponds to 1280
sub-frames and so on.
sCellDeactivationTimer |
| SCell deactivation timer in TS 36.321 [6]. Value in number of radio
frames.
Value rf4 corresponds to 4 radio frames, value rf8 corresponds to 8 radio
frames and so on. E-UTRAN only configures the field if the UE is con-
figured with one or more SCells. If the field is absent, the UE shall
delete any existing value for this field and assume the value to be set to
in-
finity. The same value applies for each SCell (although the associated
functionality is performed independently for each SCell).
shortDRX-Cycle |
| Short DRX cycle in TS 36.321 [6]. Value in number of sub-frames.
Value sf2 corresponds to 2 sub-frames, sf5 corresponds to 5 subframes
and so on. In case shortDRX-Cycle-v1130 is signalled, the UE shall
ignore shortDRX-Cycle (i.e. without suffix).
sr-ProhibitTimer |
| Timer for SR transmission on PUCCH in TS 36.321 [6]. Value in number
of SR period(s). Value 0 means no timer for SR transmission on PUCCH
is configured. Value 1 corresponds to one SR period, Value 2 corresponds
to 2*SR periods and so on. SR period is defined in TS 36.213
[23, table 10.1.5-1].
stag-Id |
| Indicates the TAG of an SCell, see TS 36.321 [6]. If the field is not
configured for an SCell (e.g. absent in MAC-MainConfigSCell), the
SCell is part of the PTAG.
stag-ToAddModList, stag-ToReleaseList |
| Used to configure one or more STAGs. E-UTRAN ensures that a STAG
contains at least one SCell with configured uplink. If, due to SCell release
a reconfiguration would result in an 'empty' TAG, E-UTRAN includes
release of the concerned TAG.
timeAlignmentTimerSTAG |
| Indicates the value of the time alignment timer for an STAG,
see TS 36.321 [6].
ttiBundling_UL |
| TRUE indicates that TTI bundling TS 36.321 [6] is enabled while FALSE
indicates that TTI bundling is disabled. TTI bundling can be enabled for
FDD and for TDD only for configurations 0, 1 and 6. For TDD,
E-UTRAN does not simultaneously enable TTI bundling and semi-
persistent scheduling in this release of specification. Furthermore, E-
UTRAN does not simultaneously configure TTI bundling and
SCells with configured uplink. |

| MAC-MainConfig field descriptions |
| --- |
| ttiBundling_DL |
| TRUE indicates that TTI bundling TS 36.321 [6] is enabled for downlink
while FALSE indicates that TTI bundling is disabled for downlink. |

While the exemplary preceding ttiBundling_DL field represents one possible Boolean ttiBundling_DL parameter, note that as another possibility (among various other possibilities), such a parameter/field might alternatively be described as follows (e.g., as a bitmap indicating DL TTI bundling status for each component carrier, or a 2-bit field indicating DL TTI bundling status of the primary carrier with one bit and of all secondary carriers with one bit):

| ttiBundling_DL |
| --- |
| Each '1' indicates that TTI bundling TS 36.321 [6] is enabled for
downlink for a corresponding carrier, while each '0' indicates that
TTI bundling is disabled for downlink for a corresponding carrier. |

Alternatively or additionally, a MAC-MainConfig IE that includes a ttiBundling_DL IE may be included within a RadioResourceConfigDedicated IE, which is an IE that is used to setup/modify/release radio bearers, to modify the MAC main configuration, to modify a semi-persistent scheduling (SPS) configuration, and to modify a dedicated physical configuration. In turn, the RadioResourceConfigDedicated IE may be included within an RRC message such as an RRCConnectionSetup message or an RRCConnectionReconfiguration message transmitted from the BS 102 to the UE 106.

The indication to enable TTI bundling for downlink communications (whether communicated using an RRCConnectionSetup message, RRCConnectionReconfiguration message, and/or a MAC-MainConfig IE, and/or via any other variation) may be provided for any of a variety of reasons. In many cases, it may be determined to enable TTI bundling for downlink communications if a downlink communication channel is experiencing (or may be expected to experience) poor RF conditions. For example, if a UE 106 is near the edge of communicative range of the BS 102, and/or if inherent propagation characteristics of a downlink channel result in greater signal attenuation, and/or if a downlink communication channel is subject to maximum transmission power limitations, TTI bundling for communications via the downlink communication channel might be implemented.

In 606, downlink communication may be performed between the BS 102 and the UE 106 using TTI bundling. Depending on the TTI bundling configuration (e.g., whether TTI bundling was indicated/enabled for one component carrier or multiple/all component carriers in 604), the downlink communication using TTI bundling may be performed on one or more component carriers of the wireless communication link. For example, if TTI bundling is enabled on the secondary carrier but not the primary carrier, downlink communications between the BS 102 and the UE 106 on the secondary carrier may use TTI bundling, while downlink communications between the BS 102 and the UE 106 on the primary carrier may not use TTI bundling.

Note that while typically for downlink data transfers (e.g., on the PDSCH in LTE), the BS 102 may specify transmission parameters (e.g., MCS, Physical Resource Blocks assignment, HARQ process number, and the redundancy version ("rv")), giving the BS 102 flexibility to choose all downlink parameters every subframe, for downlink TTI bundling, it may be the case that only one indication of downlink parameters may be transmitted (e.g., on the PDCCH in LTE) for each of the multiple "bundled" TTIs.

In such a case, the BS 102 may use any of a variety of options to specify the downlink parameters for the multiple TTIs, and in particular for the respective redundancy version of each TTI in a TTI bundle.

As a first possibility, the BS 102 may dynamically determine (and thus be capable of changing at will) the redundancy version for each TTI when sending the downlink parameters.

As a second possibility, the BS 102 may initially select/determine the redundancy version order for TTI bundles, configure the selected settings using RRC signaling, then semi-statically use the configured redundancy version order for subsequent TTI bundles without needing to explicitly indicate as much with the downlink parameters for each TTI bundle.

As a third possibility, the BS 102 may be constrained by specification considerations. For example, the redundancy version order for downlink TTI bundles may be fixed in the 3GPP specification. In such a case, the BS 102 may utilize the fixed redundancy version order as specified when performing downlink communications using TTI bundling.

The second and third possibilities may reduce the number of bits communicated on the control channel (e.g., PDCCH) relative to the first possibility, but may reduce the flexibility of the BS 102 to select the redundancy version; accordingly, the selected option may depend on the relative priority and desirability of such considerations.

Note that at a subsequent time, if it is determined to disable downlink TTI bundling on one or more carriers, one or more indications (e.g., using the MAC-MainConfig RRC IE, or another suitable type of indication) to disable downlink TTI bundling on those carriers may be transmitted from the BS 102 to the UE 106, after which downlink TTI bundling may no longer be performed on those carriers.

Thus, according to the scheme of FIG. 6, a wireless device may be able to communicate with a cellular network using TTI bundling for downlink communication.

Figure 7:
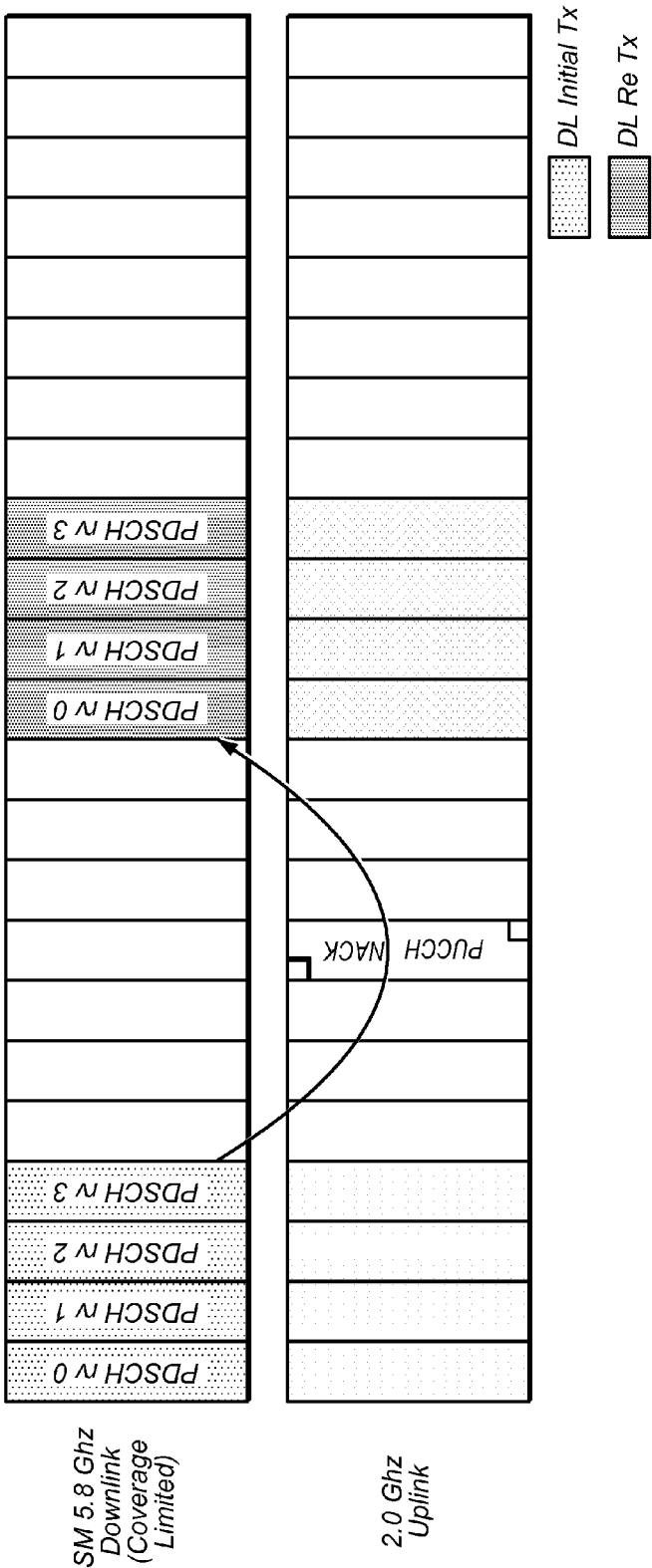
FIG. 7 illustrates an exemplary communication scheme in which TTI bundling is used for downlink communication, according to one embodiment.

FIG. 7—Downlink TTI Bundling Communication Scheme

FIG. 7 illustrates an exemplary downlink TTI bundling communication scheme which may be used in conjunction with other aspects of the present disclosure. Note that FIG. 7 and the description thereof are provided by way of example, and are not intended to be limiting to the disclosure as a whole. Numerous alternatives to and variations of the details provided herein below are possible and should be considered within the scope of the present disclosure.

The current concept of TTI bundling in 3GPP's LTE may include bundling multiple subframes into one uplink transmission by a UE to help a base station (also referred to as an eNB or eNodeB in the LTE context) with reception for cell edge UEs (which may be power limited). By bundling multiple subframes together, the UE may be able to transmit more energy and more coded bits at one opportunity, thus creating a more robust transmission.

TTI bundling has generally been used in the uplink only. Because the maximum transmission power of a UE (e.g., 23 dBm) may generally be significantly less than that of a BS (e.g., 43 dBm), it has generally been considered unnecessary for base stations.

However, there may be circumstances in which downlink TTI bundling would be beneficial. Certain of such circumstances may be illustrated by the exemplary possibility of using unlicensed ISM spectrum (e.g., 5.8 GHz) as a downlink communication channel.

As one example, if the downlink is at 5.8 GHz, and the uplink is at 2 GHz, the propagation characteristics of DL will be different than UL. For example, in this exemplary scenario the downlink channel is likely to be more strongly attenuated than the uplink channel. (or more generally, if the downlink is at a frequency subject to significant/strong attenuation). As another example, because of FCC (and/or other regulating bodies) requirements on the ISM band, which may include (but are not necessarily limited to) reduced transmission power, the BS may have a transmission power constraint far lower than 43 dBm (e.g., 23 dBm).

Thus, in such a scenario, the DL may be "energy limited" and more constrained than the UL. In such a scenario, bundling subframes (TTI bundling) in the downlink may allow the BS to serve UEs with higher attenuation and increase the proportion of UEs that can be served by the ISM band. More generally, providing the possibility to implement TTI bundling in the downlink may help balance UL and DL performance when UL and DL transmit powers are similar and UL frequencies have favorable path-loss behavior (e.g., <2 GHz) and DL carrier frequencies have high path-loss characteristics (e.g., 5.8 GHz).

As shown in FIG. 7, TTI bundling in the downlink may include bundling downlink subframes together in a single transmission instances (e.g., using consecutive TTIs). By bundling downlink subframes together in a single transmission (i.e., without waiting for an UL ACK/NACK) in challenging channel conditions, the probability that the UE can decode early increases. This in turn has the potential to decrease latency.

If after a TTI bundled downlink transmission instance the UE has not successfully extracted the data from the downlink transmission, it may still be possible for the UE to provide a negative acknowledgement ("NACK") to the BS to indicate as much. In this case (depending on system parameters, among other considerations), the BS may perform a downlink retransmission, which may include another TTI bundled transmission instance.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A base station (BS), comprising:
a radio; and
a processing element operably coupled to the radio;
wherein the radio and the processing element are configured to:
 establish a wireless communication link with a wireless user equipment (UE) device according to a first radio access technology (RAT), wherein the wireless communication link comprises at least a primary component carrier and a secondary component carrier;
 determine to enable TTI bundling for the secondary component carrier based on one or more of:
  maximum downlink transmit power limitations for the secondary component carrier;
  propagation characteristics of a frequency channel on which the secondary component carrier is configured; or
  current channel conditions for the secondary component carrier;
 provide an indication to the UE to enable transmission time interval (TTI) bundling for downlink communications with the UE via the secondary component carrier based on determining to enable TTI bundling for the secondary component carrier; and
 perform downlink communications with the UE via the secondary component carrier using TTI bundling after providing the indication.

2. The BS of claim 1, wherein the radio and the processing element are further configured to:
perform downlink communications with the UE via the primary component carrier without using TTI bundling.

3. The BS of claim 1,
wherein TTI bundling comprises bundling multiple subframes having different HARQ redundancy versions in a transmission instance using multiple consecutive TTIs.

4. The BS of claim 1, wherein the radio and the processing element are further configured to:
receive a negative acknowledgement from the UE for a TTI bundle transmitted via the secondary component carrier; and
provide a retransmission TTI bundle to the UE via the secondary component carrier.

5. The BS of claim 1,
wherein the primary component carrier is established on a frequency channel in a licensed frequency band and the secondary component carrier is established on a frequency channel in an unlicensed frequency band,
wherein TTI bundling for downlink communications with the UE is enabled for the secondary component carrier based at least in part on the secondary component carrier being established on a frequency channel in the unlicensed frequency band.

6. The BS of claim 1,
wherein the indication comprises a parameter of an RRC or MAC configuration message transmitted to the UE via a control channel.

7. The BS of claim 1, wherein the radio and the processing element are further configured to:
provide an indication to the UE to disable TTI bundling for downlink communications with the UE via the secondary component carrier; and
perform downlink communications with the UE via the secondary component carrier without using TTI bundling after providing the indication.

8. A method comprising:
by a base station (BS):
 establishing a wireless communication link with a wireless user equipment (UE) device according to a first wireless communication technology;
 configuring a primary carrier between the UE and the BS as part of the wireless communication link;
 configuring a secondary carrier between the UE and the BS as part of the wireless communication link;
 determining to enable transmission time interval (TTI) bundling for downlink communication between the BS and the UE, wherein TTI bundling comprises bundling multiple subframes having different HARQ redundancy versions in a transmission instance using multiple consecutive TTIs, and wherein determining to enable TTI bundling for downlink communication between the BS and the UE is based on one or more of:
  maximum BS transmission power limitations for the wireless communication link;
  propagation characteristics of a downlink communication channel of the wireless communication link; or
  current channel conditions of the wireless communication link;
 providing an indication to the UE to enable TTI bundling for downlink communication between the BS and the UE based on determining to enable TTI bundling for downlink communication between the BS and the UE, wherein determining to enable TTI bundling for downlink communication between the BS and the UE is specific to the secondary carrier, wherein the indication to enable TTI bundling for downlink communications between the BS and the UE is specific to the secondary carrier; and
 transmitting one or more TTI bundles to the UE via the wireless communication link.

9. The method of claim 8,
wherein the one or more TTI bundles are transmitted to the UE via the secondary carrier, wherein downlink communications between the BS and the UE on the primary carrier do not use TTI bundling.

10. The method of claim 9,
wherein the primary carrier is configured on a frequency channel in a licensed frequency band,
wherein the secondary carrier is configured on a frequency channel in an unlicensed frequency band.

11. The method of claim 8,
wherein the indication from the BS to the UE to enable TTI bundling for downlink communications between the BS and the UE comprises a parameter of a MAC-MainConfig radio resource control information element.

12. A wireless user equipment (UE) device, comprising:
a radio; and
an processing element operably coupled to the radio;
wherein the radio and the processing element are configured to:

establish a wireless communication link with a base station (BS) according to a first radio access technology (RAT), wherein the wireless communication link comprises at least a primary component carrier and a secondary component carrier;

receive an indication from the BS to enable transmission time interval (TTI) bundling for downlink communications via the secondary component carrier, wherein enabling TTI bundling for downlink communications via the secondary component carrier is based on one or more of:
- maximum downlink transmit power limitations for the secondary component carrier;
- propagation characteristics of a frequency channel on which the secondary component carrier is configured; or
- current channel conditions for the secondary component carrier; and receive TTI bundled downlink transmissions via the secondary component carrier after receiving the indication from the BS to enable TTI bundling for downlink communications via the secondary component carrier.

13. The UE of claim 12, wherein the radio and the processing element are further configured to:
receive the indication from the BS to enable TTI bundling for downlink communications via the secondary component carrier via a MAC-MainConfig information element.

14. The UE of claim 12, wherein the radio and the processing element are further configured to:
receive an indication from the BS to disable TTI bundling for downlink communications via the secondary component carrier; and
receive non-TTI-bundled downlink transmissions from the BS via the secondary component carrier after receiving the indication from the BS to disable TTI bundling for downlink communications via the secondary component carrier.

15. The UE of claim 12, wherein the radio and the processing element are further configured to:
determine that a TTI bundled downlink transmission via the secondary component carrier is not successfully received;
transmit a negative acknowledgement for the TTI bundled downlink transmission;
receive a TTI bundled downlink retransmission via the secondary component carrier in response to the negative acknowledgement.

16. The UE of claim 12, wherein the radio and the processing element are further configured to:
receive non-TTI-bundled downlink transmissions from the BS via the primary component carrier.

17. The UE of claim 12,
wherein primary component carrier and the secondary component carriers are component carriers of an LTE carrier aggregation wireless communication link between the UE and the BS.

18. The UE of claim 12,
wherein the primary component carrier is established on a frequency channel in a licensed frequency band and the secondary component carrier is established on a frequency channel in an unlicensed frequency band,
wherein TTI bundling for downlink communications is enabled for the secondary component carrier based at least in part on the secondary component carrier being established on a frequency channel in the unlicensed frequency band.

19. The method of claim 8,
wherein TTI bundling comprises bundling multiple subframes having different HARQ redundancy versions in a transmission instance using multiple consecutive TTIs.

20. The method of claim 8, the method further comprising:
receiving a negative acknowledgement from the UE for a TTI bundle transmitted via the secondary component carrier; and
providing a retransmission TTI bundle to the UE via the secondary component carrier.

21. The method of claim 8, the method further comprising:
providing an indication to the UE to disable TTI bundling for downlink communications with the UE via the secondary component carrier; and
performing downlink communications with the UE via the secondary component carrier without using TTI bundling after providing the indication.

* * * * *